(12) United States Patent
Gonsalves (10) Patent No.: US 12,288,371 B2
(45) Date of Patent: Apr. 29, 2025

(54) FINDING THE SEMANTIC REGION OF INTEREST IN IMAGES

(71) Applicant: Avid Technology, Inc., Burlington, MA (US)

(72) Inventor: Robert Gonsalves, Wellesley, MA (US)

(73) Assignee: AVID TECHNOLOGY, INC., Burlington, MA (US)

( * ) Notice: Subject to any disclaimer, the term of this patent is extended or adjusted under 35 U.S.C. 154(b) by 424 days.

(21) Appl. No.: 17/884,607

(22) Filed: Aug. 10, 2022

(65) Prior Publication Data
US 2024/0054748 A1 Feb. 15, 2024

(51) Int. Cl.
*G06V 10/25* (2022.01)
*G06T 5/94* (2024.01)
(Continued)

(52) U.S. Cl.
CPC ................ *G06V 10/25* (2022.01); *G06T 5/94* (2024.01); *G06T 7/11* (2017.01); *G06T 7/70* (2017.01);
(Continued)

(58) Field of Classification Search
CPC .... G06V 10/25; G06V 2201/07; G06V 10/82; G06V 30/274; G06V 30/19173; G06V 10/26; G06V 20/70; G06V 10/764; G06V 10/761; G06V 10/7715; G06V 10/245; G06V 10/22; G06V 20/58; G06V 20/41; G06V 10/255; G06V 10/40; G06V 40/171;
(Continued)

(56) References Cited

U.S. PATENT DOCUMENTS

| 2010/0091330 A1* | 4/2010 | Marchesotti ........... G06V 10/25 382/218 |
| 2018/0365835 A1* | 12/2018 | Yan ...................... G06V 10/764 |

(Continued)

FOREIGN PATENT DOCUMENTS

| CN | 114037640 A | * | 2/2022 |
| EP | 3869784 | | 8/2021 |
| JP | 2020-68521 | | 4/2020 |

OTHER PUBLICATIONS

He, Mask R-CNN, arXiv: 1703.0687043, Jan. 24, 2018, 12 pgs.
(Continued)

*Primary Examiner* — Jose L Couso
(74) *Attorney, Agent, or Firm* — Oliver Strimpel (57) ABSTRACT

Objects within an image are assigned a semantic interest that is indicative of their importance to the image as a whole. The objects are detected automatically, and sub-images that span each of the objects are excerpted from the image. An image embedding is determined for each of the sub-images as well as for the whole image by using an image encoder implemented as a trained multi-modal neural network. The degree of similarity between the image embeddings of a sub-image and that of the whole image is used as a measure of the semantic importance of the object portrayed in the sub-image. Objects of high semantic importance comprise the semantic regions of interest of the image. Knowledge of such regions may be used to enhance and improve the efficiency of downstream image-processing tasks, such as image compression, pan and scan, and contrast enhancement.

15 Claims, 9 Drawing Sheets

(51) Int. Cl.
*G06T 7/11* (2017.01)
*G06T 7/70* (2017.01)
*G06T 9/00* (2006.01)

(52) U.S. Cl.
CPC ...... *G06T 9/00* (2013.01); *G06T 2207/10016* (2013.01); *G06T 2207/20081* (2013.01); *G06V 2201/07* (2022.01)

(58) Field of Classification Search
CPC .... G06V 40/712; G06V 10/454; G06V 10/54; G06V 10/774; G06V 30/18057; G06T 5/94; G06T 7/11; G06T 7/70; G06T 9/00; G06T 2207/10016; G06T 2207/20081; G06T 7/10; G06T 7/74; G06T 7/194; G06T 7/215; G06T 2207/10021; G06T 2207/20132; G06T 2207/20221; G06T 2207/20112; G06T 2207/10004; G06T 3/4046; G06T 5/60; G06T 9/002; G06T 2207/20076; G06T 2207/20084; G06F 16/5854; G06F 18/22; G06F 18/23; G06F 18/2411; G06F 18/253; G06F 18/214; G06F 18/241; G06F 18/2415; H04N 7/18; H04N 19/169; H04N 19/17; H04N 19/172; H04N 19/46; H04N 19/543; G06N 3/02; G06N 3/08–088; G06N 3/0445; G06N 3/0454; G06N 3/4046; G06N 7/00; G06N 7/01; G06N 20/00; G06K 7/1482; Y10S 128/925
See application file for complete search history.

(56) References Cited

U.S. PATENT DOCUMENTS

| | | | |
|---|---|---|---|
| 2019/0050639 A1* | 2/2019 | Ast | G06F 40/30 |
| 2019/0050648 A1* | 2/2019 | Stojanovic | G06V 20/13 |
| 2019/0065911 A1* | 2/2019 | Lee | G06N 3/042 |
| 2019/0080204 A1* | 3/2019 | Schroff | G06V 10/761 |
| 2019/0286930 A1* | 9/2019 | Han | G06N 3/08 |
| 2020/0134375 A1* | 4/2020 | Zhan | G06V 10/82 |
| 2021/0248748 A1* | 8/2021 | Turgutlu | G06V 10/774 |
| 2021/0264226 A1* | 8/2021 | Lecue | G06N 3/042 |
| 2022/0147743 A1* | 5/2022 | Roy | G06V 10/82 |
| 2022/0292685 A1* | 9/2022 | Heisler | G06T 7/11 |
| 2022/0319141 A1* | 10/2022 | Liu | G06V 20/70 |
| 2023/0040513 A1* | 2/2023 | Ryan | G06V 20/52 |
| 2023/0386052 A1* | 11/2023 | Lyu | G06V 10/255 |

OTHER PUBLICATIONS

Li, Mask Dino: Towards A Unified Transformer-Based Framework for Object Detection and Segmentation, arXiv: 2206.0277v1, Jun. 6, 2022, 13 pages.

Li, Oscar: Object Semantics Aligned Pre-training for Vision-Language Tasks, arXiv: 2004.06165v5, Jul. 26, 2020, 21 pages.

Radford, Learning Transferable Visual Modes from Natural Language Supervision, arXvi: 2018.00020v1, Feb. 26, 2021, 48 pages.

Rippel, ELF-VC: Efficient Learned Flexible-Rate Video Coding, 2021 IEEE/CVF International Conference on Computer Vision, Apr. 2021, 14 pages.

Rossi, A Novel Region of Interest Extraction Layer for Instance Segmentation, arXiv: 2004.13665v2, Oct. 1, 2020, 7 pages.

Salton, Term Weighting Approaches in Automatic Text Retrieval, Dept. of Computer Science, Cornell University, #87-881, Nov. 1987, 23 pages.

Wallace, The JPEG Still Picture Compression Standard, submitted to IEEE Transactions on Consumer Electronics, Dec. 1991, 17 pages.

Zhai, LiT: Zero-Shot Transfers with Locked-image Tuning, arXiv: 2111.07991v3, Jun. 22, 2022, 26 pages.

Caron et al: "Use of power law models in detecting region of interest", Pattern Recognition, Elsevier, GB, vol. 40, No. 9, May 3, 2007 (May 3, 2007), pp. 2521-2529, XP022058965, ISSN: 0031-3203, DOI: 10.1016/J.PATCOG.2007.01.004.

Umeki Yo et al: "Salient Object Detection With Importance Degree", IEEE Access, IEEE, USA, vol. 8, Aug. 6, 2020 (Aug. 6, 2020), pp. 147059-147069, XP011805960, DOI: 10.1109/ACCESS.2020.3014886.

Wang Baoyan et al: "Salient object detection based on objectness", 2015 IEEE International Conference on Signal Processing, Communications and Computing (ICSPCC), IEEE, Sep. 19, 2015 (Sep. 19, 2015), pp. 1-5, XP032817776, ISBN: 978-1-4799-8918-8, DOI: 10.1109/ICSPCC.2015.7338816.

* cited by examiner

FINDING THE SEMANTIC REGION OF INTEREST IN IMAGES

BACKGROUND

Images that are processed by computing systems generally contain certain regions that contain the most important items within the image, while the remaining regions fill out the frame without adding significantly to the semantic content of the image. For example, an image of an important person may include a portion that renders the person's face and some or all of their body, while the surrounding regions may show the location in which image was captured. In another example, an image may present a scene from a sporting event, with the region of most interest portraying the main action captured by the image, such as a player scoring a goal in soccer or serving the ball in tennis.

When image-processing tasks are performed on such images, current systems do not distinguish between the regions of an image on the basis of their semantic importance. Instead, technical characteristics of an image, such as contrast, sharpness, and color saturation are manipulated to generate the best result across the image as a whole. However, image-processing tasks could be performed more efficiently if the image-processing system had access to information identifying the region of interest in the images being processed.

It would therefore be advantageous to enable computer systems to find important objects within an image or a video stream so that tasks such as video compression, automatic pan and scan image-cropping, and automatic color correction could be performed more efficiently.

SUMMARY

In general, in a first aspect, a method of determining semantic regions of interest within a source image comprises: receiving the source image; using an automatic object-detection system to detect a plurality of objects within the source image; subdividing the source image into a plurality of sub-images, each sub-image containing a portion of the source image that contains one of the detected plurality of objects; using a trained neural network model to: generate an image embedding for the source image; and for each sub-image of the plurality of sub-images, generate an image embedding for the sub-image; and for each sub-image of the plurality of sub-images: determining a degree of similarity between the image embedding of the sub-image and the image embedding of the source image; assigning a semantic interest to the detected object contained by the sub-image according to the determined degree of similarity between the image embedding of the sub-image corresponding to the detected object and the image embedding of the source image; and outputting an indication of the semantic interest assigned to the detected object contained by the sub-image.

Various embodiments include one or more of the following features. The automatic object-detection system is a trained neural-network model. The trained neural network model that is used to generate the image embeddings is a multi-modal neural network. For each detected object of the plurality of detected objects, the method includes generating an object mask for the detected object; generating an object mask image of the source image in which each detected object of the plurality of detected objects is replaced in the source image with a shaded silhouette of the object mask generated for the object; and applying a visual indication to each shaded silhouette, wherein the visual indication is indicative of the semantic interest assigned to the detected object corresponding the object mask. The indication of the semantic interest assigned to each detected object of the plurality of detected objects is used to enhance image-processing of the source image. The image-processing comprises image compression, and enhancing the image-processing of the source image includes varying a number of bits allocated to compressing each sub-image of the plurality of sub-images in accordance with the semantic interest assigned to the detected object corresponding to the sub-image. The source image is a frame of a video stream. The image-processing includes cropping a portion of the source image in order to achieve a desired aspect ratio of the source image; and enhancing the image-processing of the source image includes preferentially retaining within the cropped portion of the source image objects to which higher semantic interest have been assigned. The objects that are preferentially retained within the cropped image include an object to which a maximum semantic interest has been assigned. The method further comprises: selecting a subset of detected objects of the plurality of detected objects, wherein the selected subset of objects includes a set of objects to which high semantic interest has been assigned; locating a centroid of the subset of the detected objects within the source image; and cropping the source image such that the centroid of the subset of the detected objects within the source image is located at a center of the cropped image. The source image is a frame of a video stream. The image processing includes contrast enhancement, and the contrast enhancement includes boosting contrast in a region of the source image containing a detected object to which a high semantic interest has been assigned. The source image is a frame of a video stream.

In general, in another aspect, a computer program product comprises: a non-transitory computer-readable medium with computer-readable instructions encoded thereon, wherein the computer-readable instructions, when processed by a processing device, instruct the processing device to perform a method of determining semantic regions of interest within a source image, the method comprising: receiving the source image; using an automatic object-detection system to detect a plurality of objects within the source image; subdividing the source image into a plurality of sub-images, each sub-image containing a portion of the source image that contains one of the detected plurality of objects; using a trained neural network model to: generate an image embedding for the source image; and for each sub-image of the plurality of sub-images, generate an image embedding for the sub-image; and for each sub-image of the plurality of sub-images: determining a degree of similarity between the image embedding of the sub-image and the image embedding of the source image; assigning a semantic interest to the detected object contained by the sub-image according to the determined degree of similarity between the image embedding of the sub-image corresponding to the detected object and the image embedding of the source image; and outputting an indication of the semantic interest assigned to the detected object contained by the sub-image.

In general, in a further aspect, a system comprises: a memory for storing computer-readable instructions; and a processor connected to the memory, wherein the processor, when executing the computer-readable instructions, causes the system to perform a method of determining semantic regions of interest within a source image, the method comprising: receiving the source image; using an automatic object-detection system to detect a plurality of objects within the source image; subdividing the source image into a plurality of sub-images, each sub-image containing a portion of the source image that contains one of the detected plurality of objects; using a trained neural network model to: generate an image embedding for the source image; and for each sub-image of the plurality of sub-images, generate an image embedding for the sub-image; and for each sub-image of the plurality of sub-images: determining a degree of similarity between the image embedding of the sub-image and the image embedding of the source image; assigning a semantic interest to the detected object contained by the sub-image according to the determined degree of similarity between the image embedding of the sub-image corresponding to the detected object and the image embedding of the source image; and outputting an indication of the semantic interest assigned to the detected object contained by the sub-image.

DETAILED DESCRIPTION

During the late 2010s and early 2020s, artificial intelligence (AI) and machine learning (ML) computer systems have developed rapidly. A common type of machine-learning computer system uses a neural network model. Some such neural network models have been developed and trained to detect objects in images. The methods described herein make use of such object-detection systems in combination with ML-based image-encoders in order to identify semantic regions of interest within an image. As used herein, a region of an image is deemed semantically interesting if it contains what the person creating and sharing the image may have deemed significant about the image. For example, if the footage contains an interview with two people, the semantically interesting portions of the scene will be the two people, not the plants in the background. Or, in the case of a cooking show, it would be the pan on the stove that the chef is actively using. In certain cases, this region may represent the content that caused the image to be captured.

Figure 1:
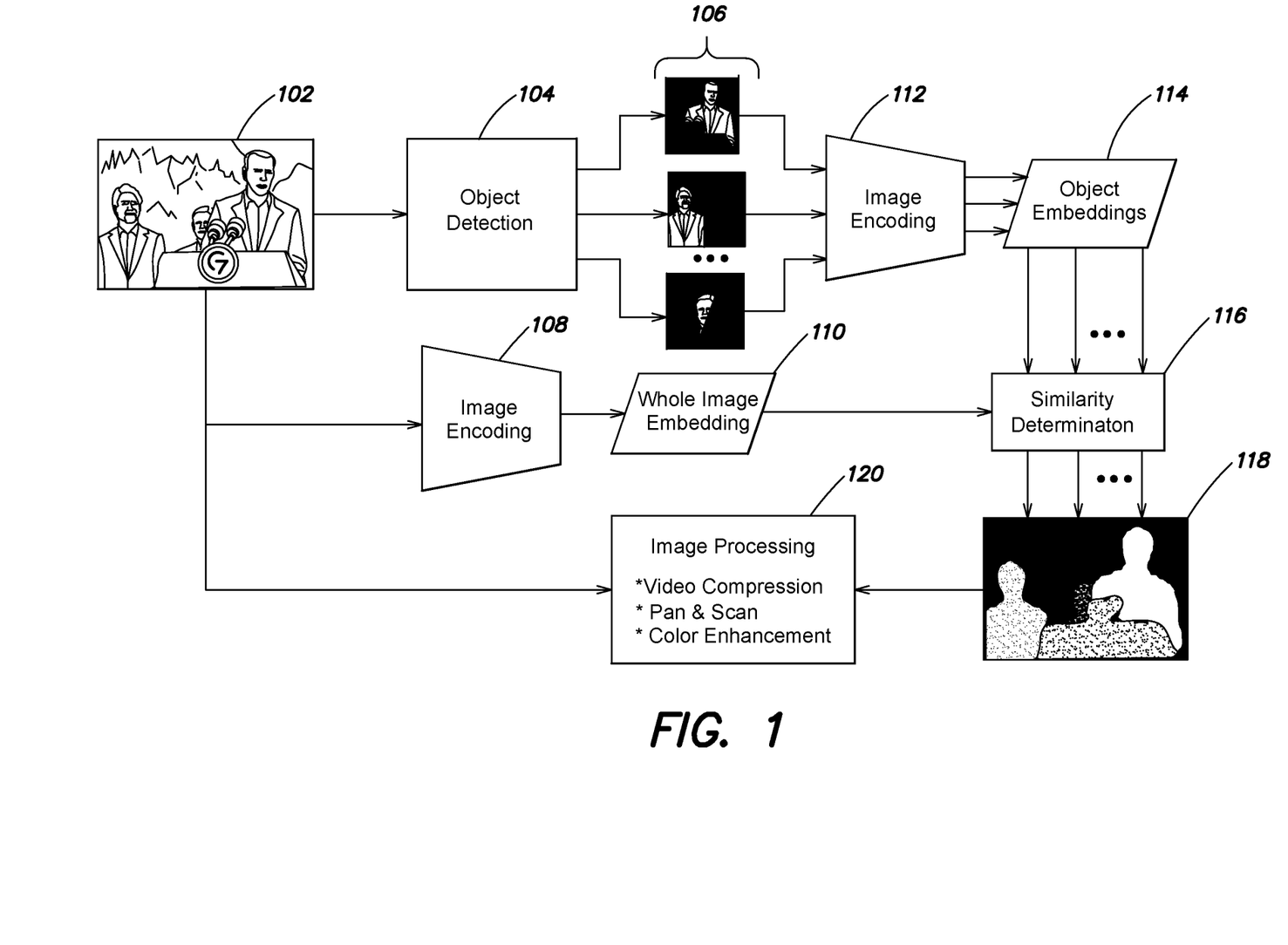
FIG. 1 is a high-level flow diagram illustrating the main steps of the described methods for automatically determining semantic regions of interest within an image.

FIG. 1 is a high-level flow diagram showing the various steps involved in finding the semantic region of interest within an image. Source image 102 for which the semantic region of interest is to be found, is processed by a system that performs object detection 104 within the image. Object detection may be performed by a trained ML model or by an algorithmic method, such as edge-detection or contrast analysis. Examples of suitable object-detection systems include: Mask DINO by Feng Li. et al., arXiv:2206.02777; Swin Transformer by Ze Liu et al., arXiv:2103.14030; Generic RoI Extractor by Leonardo Rossi et al. arXiv: 2004.13665 [cs.CV]; and Mask R-CNN by Kaiming He et al., arXiv:1703.06870 [cs.CV]. Such systems generally run at 10 frames per second, so that when being used to detect objects within a video stream, when new frames are received about 30 times per second, only certain images are analyzed. The images that are analyzed may be selected arbitrarily, such as every $10^{th}$, $15^{th}$ or $20^{th}$ frame, or they may be selected on the basis of scene changes when the overall composition of the image is changed. The interval between analyzed frames may be determined automatically based on the processing time required to perform the object recognition on a given computing platform. Object-detection systems are effective in locating the various objects that they were trained to find within images. The output from object-detection systems includes, for each detected object, the class of the detected object, a probability score that the object is in the class, a bounding box defined by the furthest left, top, right, and bottom co-ordinates of the object mask, and a mask, which consists of a binary image the size of the bounding box that indicates which pixels belong to the object. In the methods described herein, the object class and the score are discarded, and the object mask is used to create a "cut-out" image of object silhouettes as illustrated in FIG. 1, 118. When object-detection systems encounter unknown objects, they can identify the presence of the object, but they are not able to determine what the object is. In this situation, the system outputs a low probability score across all the possible objects.

Figure 2:
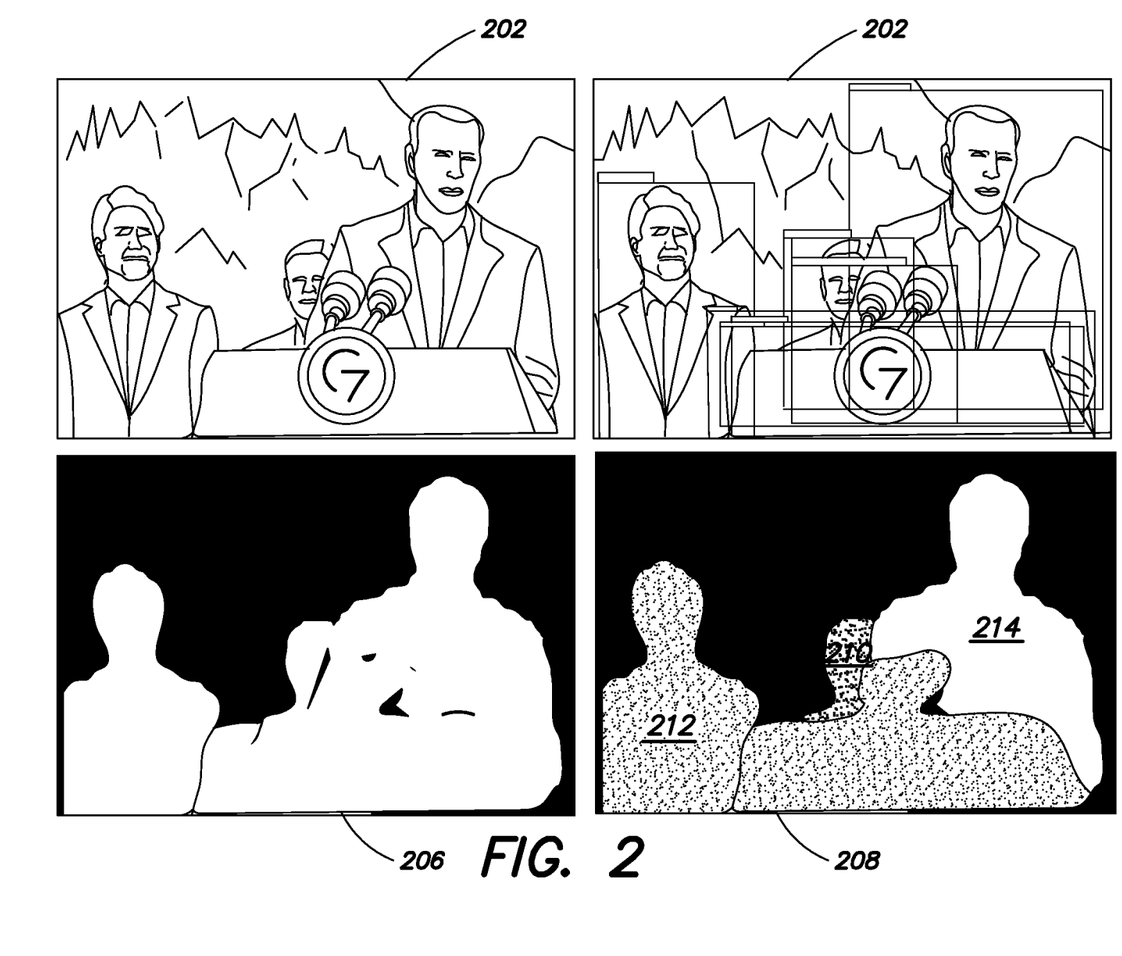
FIG. 2 illustrates the application of the described methods to an image of world leaders and shows the original image, the detected objects, the object masks, and the object masks shaded according to semantic interest.

The system performing object-detection 104 outputs sub-images 106 of the source image that portray the objects the system has detected. For example, in an image showing a number of people, the system may detect each of the people in the frame. This is illustrated in FIG. 2, in which image 202 of world leaders is supplied to the object-detection system, and the image portions containing the detected objects are framed by boxes in image 204. The object-detection system has found all of the people, and the corresponding object masks shown in object mask image 206 fill the scene and include the people in the background. This example illustrates how object-detection systems on their own cannot distinguish between the key objects in an image and objects of lesser or peripheral importance.

An image-encoder is deployed to generate object embeddings. As used herein, an image-encoder refers to a multimodal neural network that has been trained to encode images and text to a compatible vector space. Such vector spaces are referred to as latent spaces in which points in the space have coordinates such that points that are "similar" are closer together in the space. The definition of similar is not explicit—the determination of the embedding is done by training the neural network model on a large set of images whose similarity to each other is known. The encoding of an image generates a vector in this vector space that represents a semantic embedding for the image. Latent spaces and semantic embeddings are well known in the field of machine learning and neural networks. Examples of image-encoders include: the Contrastive Language-Image Pre-training system (CLIP), available from OpenAI of San Francisco, California, described in "Learning Transferable Visual Models From Natural Language Supervision," by Radford, A. et al., arXiv:2103.00020v1, which is wholly incorporated herein by reference; Language Interpretability Tool (LiT) from Google Research of Mountain View, California, described in "The Language Interpretability Tool: Extensible, Interactive Visualizations and Analysis for NLP Models," by Tenney, A. et al., arXiv:2008.05122v1, which is wholly incorporated herein by reference; and Object-Semantics Aligned Pre-training for Vision-Language Tasks (Oscar) from Microsoft Corp., of Redmond, Washington, described in "Oscar: Object-Semantics Aligned Pre-training for Vision-Language Tasks," by Li, X. et al., arXiv: 2004.06165, which is wholly incorporated herein by reference.

In the methods described herein, the whole source image is encoded 108 by an image-encoder to generate an image embedding 110 for the whole image. This embedding may be expected to appear at latent space coordinates close to other "similar" images, i.e., images that portray similar content or have a similar intent. For a trained neural network image-encoder model, images that are close to each other in embedding space reflect the similarity of text captions for images like them in the training data set. Commonly used similarity measures assign a 100% similarity to two identical images, a 10% similarity to two quite dissimilar images, and a 70% or greater similarity for images that are deemed semantically similar. The similarity between two images may be determined as a multidimensional distance metric or as a cosine metric, as described in G. Salton and C. Buckley, "Term-weighting Approaches in Automatic Text Retrieval," Information Processing and Management, 1; 24(5):513-23, January 1988, which is wholly incorporated herein by reference.

Each member of the set of sub-images 106 portraying the detected objects is also encoded 112 by an image-encoder to generate image embeddings 114 for each of the sub-images 106. In the next step, similarity determination 116 is performed in which whole-image embedding 110 is compared with each of the object-embeddings 114 to determine their relative similarity. The degree of similarity of each of the object-embeddings to the whole-image embedding is used as a measure of the semantic interest of the object represented in the corresponding image portion. In various embodiments, this similarity is represented as a set of semantic interest weights with the image portions having embeddings that are most similar to that of the whole-image embedding having the highest weights. In the object-embedding latent space, the degree of similarity between two embeddings corresponds to a multidimensional distance between the embeddings. As used herein, semantically important objects may also be referred to as objects with high semantic saliency, and the terms are used interchangeably herein. Objects with high semantic importance or saliency scores are important to the overall scene and comprise the semantic regions of interest of an image.

The semantic weights of each of the detected objects may be represented graphically by generating object-mask image 118 in which the areas corresponding to each of the object masks are color-coded according to the semantic weight assigned to the corresponding object. In various embodiments the mask is assigned a shade of grey, as shown in image 118, in which the shade assigned to an object mask indicates the semantic importance of the corresponding object. For the example of the image of world leaders shown in FIG. 2, the results of the described methods are shown as a grey-scale-shaded object mask image 208 in which the object of greatest semantic importance is deemed to be President Biden as indicated by object mask 214 having the lightest shade, the next most important being Canadian Prime Minister Justin Trudeau with next lightest object mask 212, and German Chancellor Olaf Scholz being next with the third-lightest object mask 210. In certain embodiments, the object mask image may use text, such as a semantic weight, or icons to indicate the semantic importance that has been determined for each of the objects.

Once the object masks for a given source image have been generated and ranked according to the saliency of their corresponding objects, the masks and their respective semantic scores are associated with the source image. The association of a source image with the semantic scores for each of the object masks and their corresponding objects may be implemented by including this data within the source image metadata that may contain, for each mask, a mask position, mean pixel values, pixel-value standard deviation, and a low-resolution map. In some implementations, the data is stored in a semantic database, with the semantic information keyed to the source imagery. In other implementations, a segmented image corresponding to each source image is stored, with each segment corresponding to an object mask and its semantic score.

The determination of the semantic regions of interest may be used to optimize various image-processing tasks, such as video compression, image format changes, and color correction, as described below. To facilitate the optimization process, source imagery 102 as well as object mask image 118, tagged or shaded with the semantic importance of each mask, is input to a system that performs image processing 120.

Figure 3:
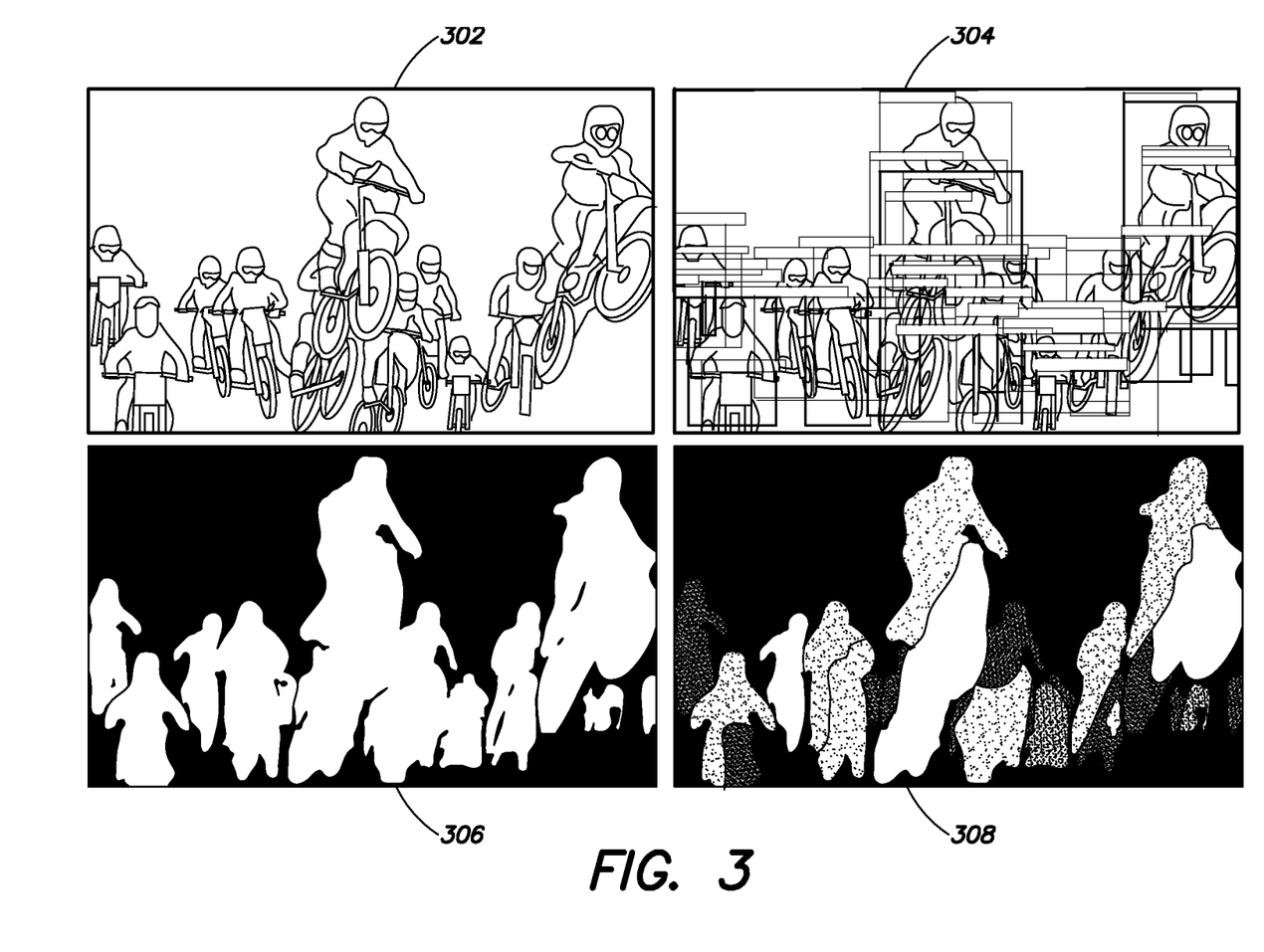
FIG. 3 illustrates the application of the described methods to an image of a cross-country motorcycle race and shows the original image, the detected objects, the object masks, and the object masks shaded according to semantic interest.
Figure 4:
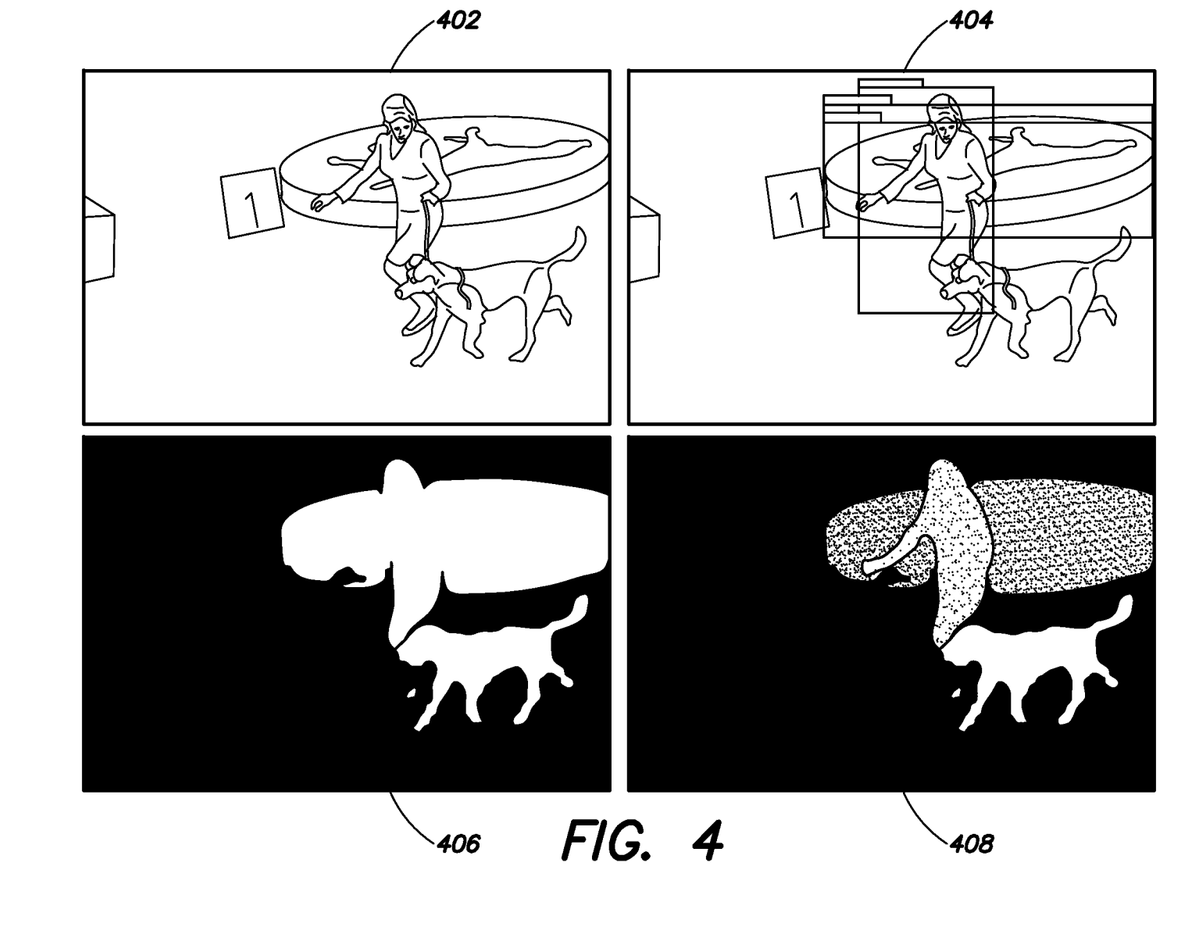
FIG. 4 illustrates the application of the described methods to an image of a dog talent show and shows the original image, the detected objects, the object masks, and the semantic regions of interest.
Figure 5:
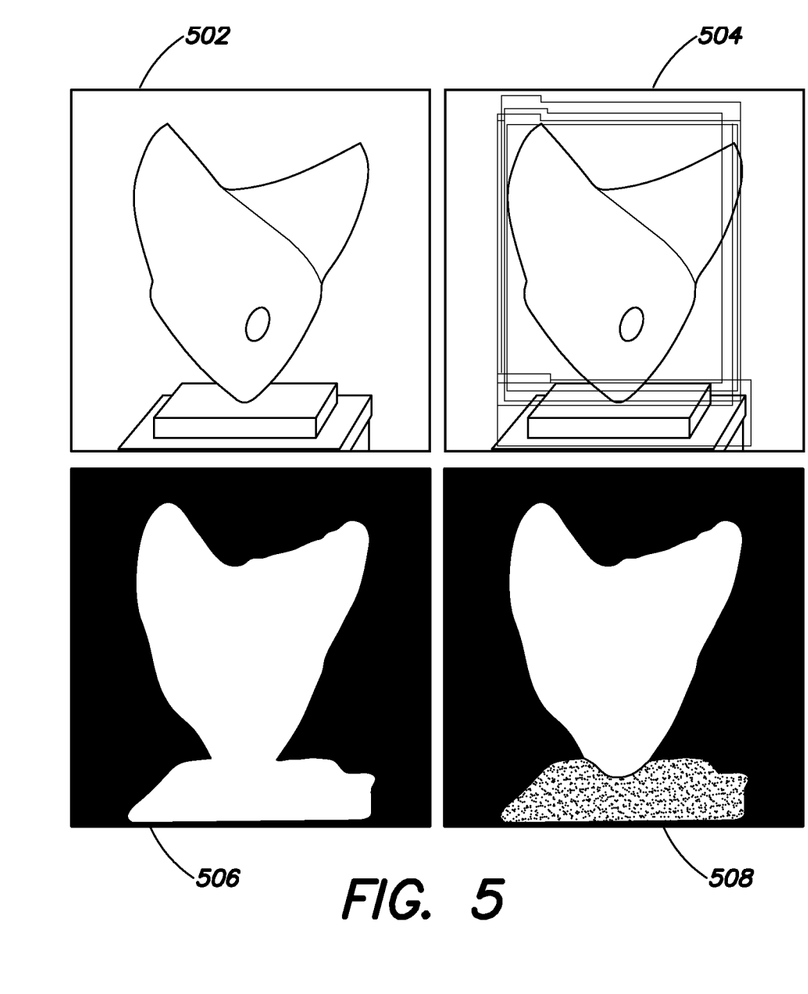
FIG. 5 illustrates the application of the described methods to an image of a modern sculpture and shows the original image, the detected objects, the object masks, and the object masks shaded according to semantic interest.

FIGS. 3, 4, and 5 illustrate examples of how the described system performs. In each case, the figures show the source image, the image with frames overlaid to indicate the portions of the image containing objects detected by the object-detection system, an image showing the object masks, which correspond to the spatial extent of the detected objects, and an object mask shaded according to the determined semantic interest of each of the detected objects, with the lighter the shade, the more important the object. In the example shown in FIG. 3, original image 302 shows a scene that is densely populated by contestants in a cross-country motorbike race, with the leading contestants partially occluding those behind. In such a dense scene, the object-detection system has identified many of the contestants, as shown in the image with detected object overlays 304, thus providing many candidate sub-images constituting candidate regions of interest to the image-encoder. The corresponding object masks are shown in white in image 306 and are shaded according to their semantic interest in image 308. As can be seen in image 308, the system has determined that the motorbike of the person leading the race is of the greatest interest, followed by the motorbike of the very close competitor to the right of the leader. The system has successfully distinguished the riders from their motorbikes, assigning greater importance to the bikes. In FIG. 4, source image 402 of a dog talent show includes a dog owner, her dog, and several people in the background, each of which has been identified by the object-detection system as shown in images 404 and 406. The shading according to semantic importance in image 408 indicates that the system successfully identified the dog as being the most important aspect of the image. In FIG. 5, source image 502 features a piece of modern sculpture that has a shape that may be quite different from any object that was featured in the set of images used to train the image encoder. None-the-less, as shown in detected-object image 504, object-mask image 506, and in the image of object masks shaded by semantic importance 508, the system identified the modern sculpture as having the greatest semantic importance.

We now describe examples of how automatically-determined semantic regions of interest within images may be used to improve and/or make more efficient various aspects of video editing. These include: improving the composition, for example with zoom and pan and scan; improving clarity, for example with color correction and color enhancement; and improving overall image quality, for example using adaptive compression.

In one application, the described methods are used to improve the efficiency and quality of image compression, including both video compression and still-image compression. For video compression, by default, an encoder treats all macroblocks in the image equally, where a macroblock typically consists of a block of 16×16 pixels. By using the described determination of the semantic region of interest, an encoder is able to allocate compressed bits according to the semantic region of interest weightings. This has the effect of improving the quality of semantically important areas within an image by reducing compression artifacts in important regions at the expense of adding artifacts to areas that are of less importance to the overall scene. For example, in an image containing one or more human faces, the system may allocate a high semantic weight to the expression on a face. A suitably enabled video compression system is then able to compress and decompress the facial expression with more fidelity, reducing or eliminating compression artifacts in the facial region of greatest importance. One measure of the quality of a compressed image is the number of bits per pixel (BPP), where the number of bits is the total number of bits in the compressed image including the chrominance components, and the number of pixels is the number of samples in the luminance component. Images having BPP values of 0.25-0.5 are considered to be of moderate quality, those having BPP=0.5-0.75 are of very good quality, those having BPP=0.75-1.5 are of excellent quality, and those having BPP=1.5-2.0 are usually indistinguishable from the original. For example, to achieve an overall compressed image having BPP=0.75 in an image having a region of sematic interest comprising 10% of the image pixels, the BPP for the region of semantic interest may be set to 2.0, and the rest of the image to set to 0.61 so as to average out to 0.75 BPP.

Figure 6:
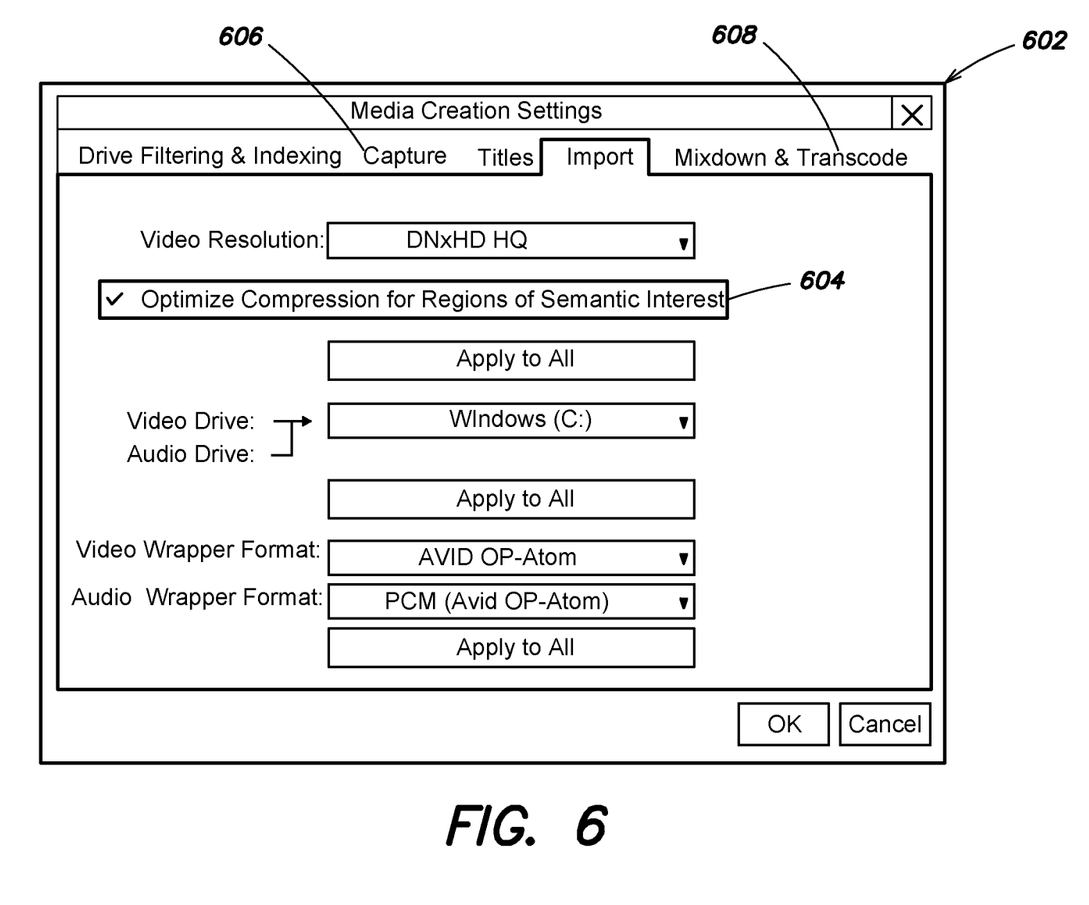
FIG. 6 is a diagrammatic screenshot of a user interface dialog box of a video editing application that includes a user-selectable option to optimize video compression for semantic regions of interest within a video that is being imported into the video editing application.

In common workflows, the video compression is performed by a video editing application, such as Avid® Media Composer®, a product of Avid Technology, Inc. of Burlington, Massachusetts. FIG. 6 is a diagrammatic screenshot of a user-interface dialog-box 602 for media-creation settings within a video-editing application. The figure illustrates option 604 to select the optimization of compression based on the semantic regions of interest when importing video into the video-editing application. Similar dialog boxes may be available to users when performing media capture when capture tab 606 is selected, and when mixing down and transcoding media when mixdown & transcode tab 608 is selected.

In another application, automatic determination of the semantic regions of interest is used when determining how to crop an image when the aspect ratio changes, a process commonly referred to as pan and scan. Such aspect ratio changes are often required when an image or a video clip is imported into a media-editing application such as a non-linear video-editing system and edited for output on platforms having displays with an aspect ratio that differs from that of the source image or video. For example, a video edited with a 16×9 aspect ratio (landscape) may be exported in a 9×16 aspect ratio (portrait) for playback on certain platforms, such as a smartphone. In this case, material on one or both of the left and right edges must be cropped. The selection of what is cropped is guided by the semantic region of interest determination so as to ensure that the most important objects in the image are not lost in the cropping process.

In various implementations, the system is able to follow the most important objects as they move horizontally across an image, for example by tracking the object assigned the most semantic weight and ensuring that it is retained within the cropped image or placed as near as possible to center of the image along the horizontal dimension. In other implementations, the system attempts to maximize the retention of several of the semantically most salient objects, such as the top two, three, or four objects. In various other implementations, the system uses a semantic importance threshold, e.g., 70%, tracks all the objects meeting or exceeding the threshold value, and centers the cropped image on the centroid of these objects' horizontal position. If it is not possible to retain within the cropped image all of the objects selected for their semantic importance, the system may attempt to retain a subset of these objects, prioritizing those having the highest semantic saliency. The system is able to pan the image in order to optimize the positioning of the important objects. The amount of cropping depends on the resolution of the original imagery and the resolution of the target display. For example, in a shot of a man playing frisbee with a dog, the system will likely try to keep the man, the dog, and the frisbee in the cropped frame. But if it is not possible to show all three salient objects, it may follow just the dog and the frisbee, cropping out the man.

Figure 7:
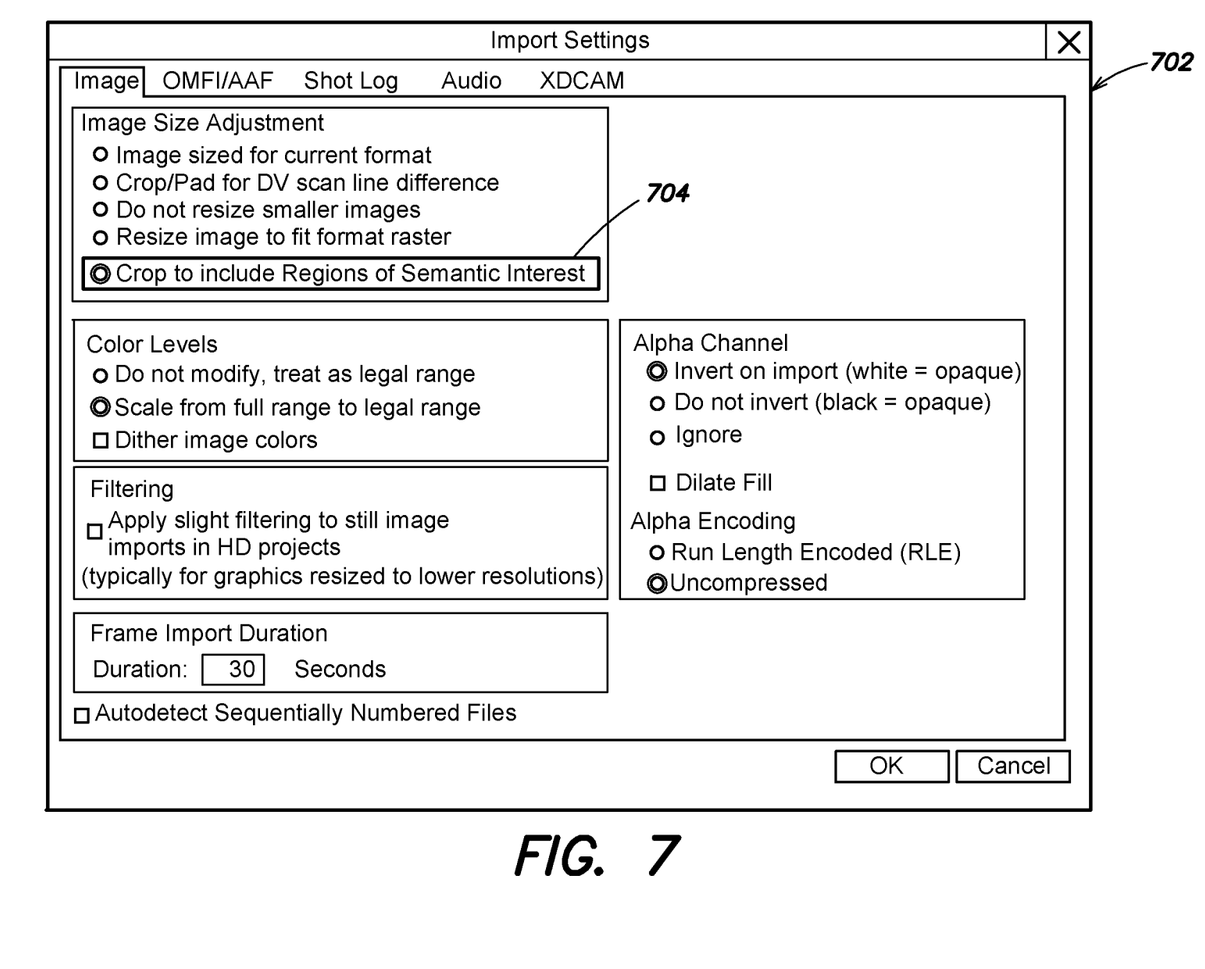
FIG. 7 is a diagrammatic screenshot of a user interface dialog box of a video editing application that includes a user-selectable option to crop incoming imagery to include semantic regions of interest.

FIG. 7 is a diagrammatic screenshot of user interface dialog box 702 for import settings within a video editing application. The figure illustrates option 704 to select the optimization of cropping an image to a format having a different aspect ratio so as to include semantic regions of interest within the cropped image. This process is generally performed when video or still imagery of one format is needed in a second format for output to a device having a different aspect ratio display screen from that of the source imagery.

Figure 8:
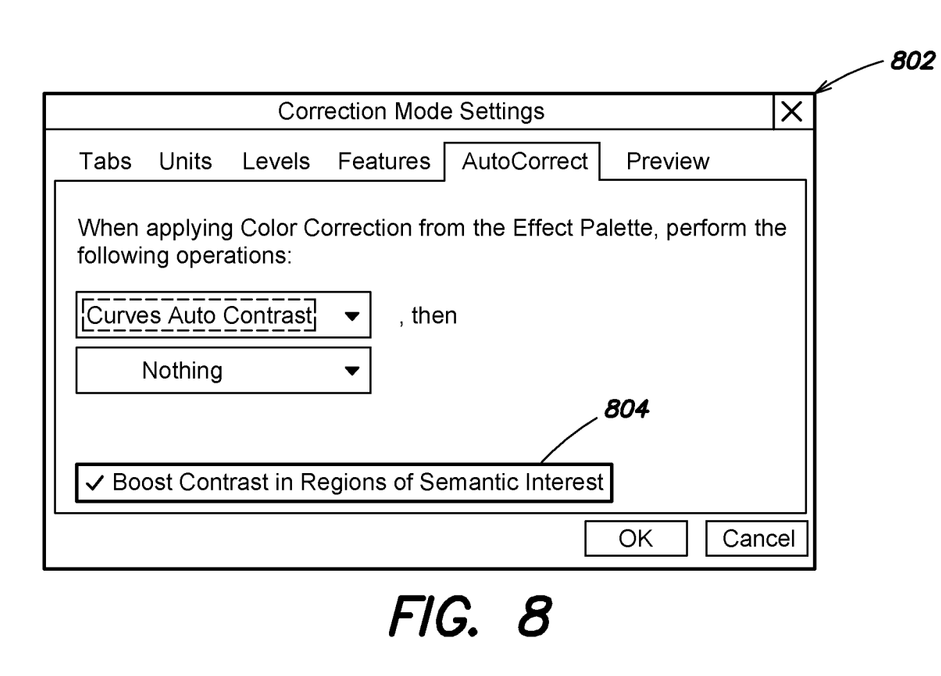
FIG. 8 is a diagrammatic screenshot of a user interface dialog box of a video editing application that includes a user-selectable option to boost contrast in regions of semantic interest when performing color correction to a video that is being edited.

Color enhancement may also be partially or fully automated using the automatic determination of the semantic regions of interest. The system analyzes pixel values in the identified regions of interest and calculates the mean and standard deviation of the RGB values. When performing the color correction, a curve in a look-up-table is used to increase the slope of the contrast for the values within the semantic regions of interest. Color enhancement may be performed for video and for still images. When enhancing video, the applied enhancement parameter changes are smoothed between successive frames to prevent sudden changes that may be jarring to a viewer. The smoothing may be specified in terms of a percentage or an absolute change in the parameter values, e.g., for the contrast slope, between successive frames or between successive groups of frames. In various implementations, the system automatically increases the contrast in the image areas deemed to be important by the semantic region of interest determination. FIG. 8 is a diagrammatic screenshot of user-interface dialog box 802 for color-correction mode settings within a video-editing application. The interface includes option box 804 that enables the user to boost contrast in the semantic regions of interest within the imagery being edited when performing color correction on the imagery. The contrast enhancement may be applied only to objects that meet or exceed a threshold value of semantic importance. The threshold may be set in absolute terms or may be defined by a limit on the number of objects to be processed in a given frame. For example, the system may automatically enhance the contrast of the top 2-4 objects ranked by saliency. The result is to bring out the detail in the important parts of an image.

Figure 9:
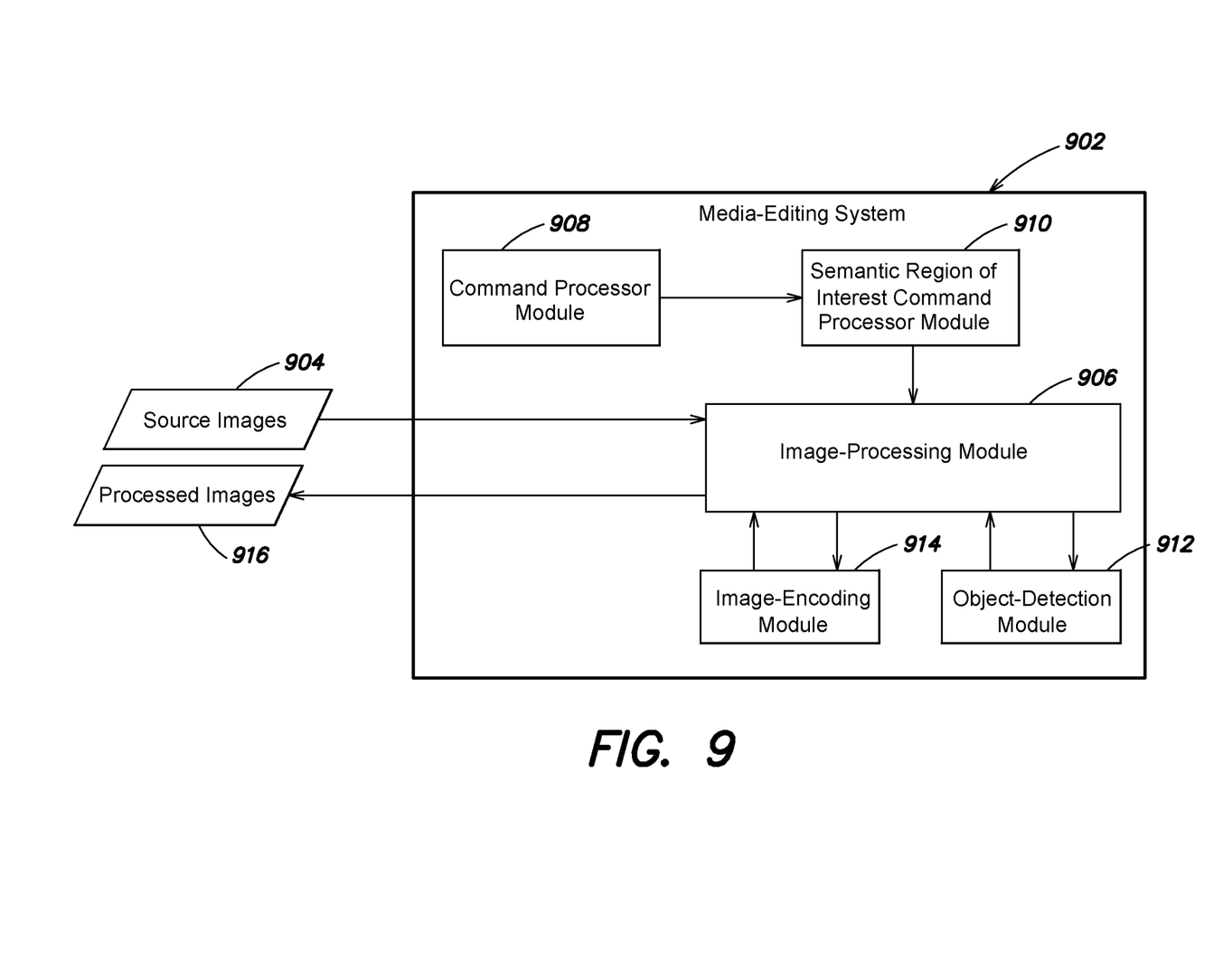
FIG. 9 is a high-level block diagram of a system for determining the semantic regions of interest of an image or video.

FIG. 9 is a high-level block diagram of a system for implementing the determination of the semantic regions of interest in an image and for using this determination to enhance image processing. A media-editing application, which may be a non-linear video-editing application, is hosted on media-editing system 902. System 902 may be a general-purpose computer such as a stand-alone workstation or personal computer, or it may be a computing resource located in the cloud. The media-editing application comprises multiple software modules for performing the various functions involved when still images and video imagery are edited. For purposes of clarity, FIG. 9 only shows modules of the media editing application that are directly involved in implementing the methods described herein. Source images 904, which may be stored locally or in the cloud, are input to image-processing module 906. The source images may be still images or a sequence of images comprising a video stream. Command-processor module 908 processes commands to be executed by the media-editing application. The commands may be received from a user or may be generated automatically by a script. When command 910 to determine the semantic regions of interest received, image processing module 906 sends source images 904 to object-detection module 912. Object-detection module may be implemented by a trained neural network model as described above. The object-detection system detects the objects and returns an object mask image that defines the spatial extent of the objects detected within the source imagery. The image-handling system then divides up the original image into a set of sub-images, each sub-image containing a portion of the original image that portrays one of the detected objects. It then sends the sub-images as well as the whole source image to image-encoding module 914. Image-encoding module 914 may be a trained neural network model as discussed above. In various implementations, object-detection module 912 and image-encoding module 914 are implemented on a single system that is trained to detect objects and determine their levels of semantic interest. The image-encoding module returns embeddings for the whole image as well as for each of the sub-images. The image-processing system then performs a similarity determination, ranking the semantic importance of each of the various objects according to the "closeness" of their embeddings to that of the whole image. The image-processing system is then able to store the source images, which are tagged with the semantic region of interest information. The tagged source images may be made available to other modules of the media editing application that are able to perform the image-processing tasks described above. In some implementations, various image-processing tasks, as those described above, may be accelerated by special-purpose hardware such as a GPU (not shown), or the image-processing may be performed by a cloud-based service. Processed images 916 are output by image-processing module 906.

The various components of the system described herein may be implemented as a computer program using a general-purpose computer system. Such a computer system typically includes a main unit connected to both an output device that displays information to an operator and an input device that receives input from an operator. The main unit generally includes a processor connected to a memory system via an interconnection mechanism. The input device and output device also are connected to the processor and memory system via the interconnection mechanism.

One or more output devices may be connected to the computer system. Example output devices include, but are not limited to, liquid crystal displays (LCD), plasma displays, OLED displays, various stereoscopic displays including displays requiring viewer glasses and glasses-free displays, cathode ray tubes, video projection systems and other video output devices, loudspeakers, headphones and other audio output devices, printers, devices for communicating over a low or high bandwidth network, including network interface devices, cable modems, and storage devices such as disk, tape, or solid state media including flash memory. One or more input devices may be connected to the computer system. Example input devices include, but are not limited to, a keyboard, keypad, track ball, mouse, pen/stylus and tablet, touchscreen, camera, communication device, and data input devices. The invention is not limited to the particular input or output devices used in combination with the computer system or to those described herein.

The computer system may be a general-purpose computer system, which is programmable using a computer programming language, a scripting language or even assembly language. The computer system may also be specially programmed, special purpose hardware. In a general-purpose computer system, the processor is typically a commercially available processor. The general-purpose computer also typically has an operating system, which controls the execution of other computer programs and provides scheduling, debugging, input/output control, accounting, compilation, storage assignment, data management and memory management, and communication control and related services. The computer system may be connected to a local network and/or to a wide area network, such as the Internet. The connected network may transfer to and from the computer system program instructions for execution on the computer, media data such as video data, still image data, or audio data, metadata, review and approval information for a media composition, media annotations, and other data.

A memory system typically includes a computer readable medium. The medium may be volatile or nonvolatile, writeable or nonwriteable, and/or rewriteable or not rewriteable. A memory system typically stores data in binary form. Such data may define an application program to be executed by the microprocessor, or information stored on the disk to be processed by the application program. The invention is not limited to a particular memory system. Time-based media, such as video and audio, may be stored on and input from magnetic, optical, or solid-state drives, which may include an array of local or network attached disks.

A system such as described herein may be implemented in software, hardware, firmware, or a combination of the three. The various elements of the system, either individually or in combination may be implemented as one or more computer program products in which computer program instructions are stored on a non-transitory computer readable medium for execution by a computer or transferred to a computer system via a connected local area or wide area network. Various steps of a process may be performed by a computer executing such computer program instructions. The computer system may be a multiprocessor computer system or may include multiple computers connected over a computer network or may be implemented in the cloud. The components described herein may be separate modules of a computer program, or may be separate computer programs, which may be operable on separate computers. The data produced by these components may be stored in a memory system or transmitted between computer systems by means of various communication media such as carrier signals.

Having now described an example embodiment, it should be apparent to those skilled in the art that the foregoing is merely illustrative and not limiting, having been presented by way of example only. Numerous modifications and other embodiments are within the scope of one of ordinary skill in the art and are contemplated as falling within the scope of the invention.

What is claimed is:

1. A method of determining semantic regions of interest within a source image, the method comprising:
   receiving the source image;
   using an automatic object-detection system to detect a plurality of objects within the source image;
   subdividing the source image into a plurality of sub-images, each sub-image containing a portion of the source image that contains one of the detected plurality of objects;
   using a trained neural network model to:
      generate an image embedding for the source image; and
      for each sub-image of the plurality of sub-images, generate an image embedding for the sub-image; and
   for each sub-image of the plurality of sub-images:
      determining a degree of similarity between the image embedding of the sub-image and the image embedding of the source image;
      assigning a semantic interest to the detected object contained by the sub-image according to the determined degree of similarity between the image embedding of the sub-image corresponding to the detected object and the image embedding of the source image; and
      outputting an indication of the semantic interest assigned to the detected object contained by the sub-image.

2. The method of claim 1, wherein the automatic object-detection system is a trained neural-network model.

3. The method of claim 1, wherein the trained neural network model that is used to generate the image embeddings is a multi-modal neural network.

4. The method of claim 1, further comprising:
   for each detected object of the plurality of detected objects, generating an object mask for the detected object;
   generating an object mask image of the source image in which each detected object of the plurality of detected objects is replaced in the source image with a shaded silhouette of the object mask generated for the object; and
   applying a visual indication to each shaded silhouette, wherein the visual indication is indicative of the semantic interest assigned to the detected object corresponding the object mask.

5. The method of claim 1, wherein the indication of the semantic interest assigned to each detected object of the plurality of detected objects is used to enhance image-processing of the source image.

6. The method of claim 5, wherein the image processing comprises image compression, and enhancing the image processing of the source image includes varying a number of bits allocated to compressing each sub-image of the plurality of sub-images in accordance with the semantic interest assigned to the detected object corresponding to the sub-image.

7. The method of claim 6, wherein the source image is a frame of a video stream.

8. The method of claim 5, wherein:
   the image processing includes cropping a portion of the source image in order to achieve a desired aspect ratio of the source image; and
   enhancing the image processing of the source image includes preferentially retaining within the cropped portion of the source image objects to which higher semantic interest have been assigned.

9. The method of claim 8, wherein the objects that are preferentially retained within the cropped image include an object to which a maximum semantic interest has been assigned.

10. The method of claim 8, further comprising:
    selecting a subset of detected objects of the plurality of detected objects, wherein the selected subset of objects includes a set of objects to which high semantic interest has been assigned;
    locating a centroid of the subset of the detected objects within the source image; and
    cropping the source image such that the centroid of the subset of the detected objects within the source image is located at a center of the cropped image.

11. The method of claim 8, wherein the source image is a frame of a video stream.

12. The method of claim 5, wherein the image processing includes contrast enhancement, and the contrast enhancement includes boosting contrast in a region of the source image containing a detected object to which a high semantic interest has been assigned.

13. The method of claim 12, wherein the source image is a frame of a video stream.

14. A computer program product comprising:
   a non-transitory computer-readable medium with computer-readable instructions encoded thereon, wherein the computer-readable instructions, when processed by a processing device, instruct the processing device to perform a method of determining semantic regions of interest within a source image, the method comprising:
      receiving the source image;
      using an automatic object-detection system to detect a plurality of objects within the source image;
      subdividing the source image into a plurality of sub-images, each sub-image containing a portion of the source image that contains one of the detected plurality of objects;
      using a trained neural network model to:
         generate an image embedding for the source image; and for each sub-image of the plurality of sub-images, generate an image embedding for the sub-image; and for each sub-image of the plurality of sub-images:
  determining a degree of similarity between the image embedding of the sub-image and the image embedding of the source image;
  assigning a semantic interest to the detected object contained by the sub-image according to the determined degree of similarity between the image embedding of the sub-image corresponding to the detected object and the image embedding of the source image; and
  outputting an indication of the semantic interest assigned to the detected object contained by the sub-image.

15. A system comprising:
a memory for storing computer-readable instructions; and
a processor connected to the memory, wherein the processor, when executing the computer-readable instructions, causes the system to perform a method of determining semantic regions of interest within a source image, the method comprising:
receiving the source image;
using an automatic object-detection system to detect a plurality of objects within the source image;
subdividing the source image into a plurality of sub-images, each sub-image containing a portion of the source image that contains one of the detected plurality of objects;
using a trained neural network model to:
  generate an image embedding for the source image; and
  for each sub-image of the plurality of sub-images, generate an image embedding for the sub-image; and
for each sub-image of the plurality of sub-images:
  determining a degree of similarity between the image embedding of the sub-image and the image embedding of the source image;
  assigning a semantic interest to the detected object contained by the sub-image according to the determined degree of similarity between the image embedding of the sub-image corresponding to the detected object and the image embedding of the source image; and
  outputting an indication of the semantic interest assigned to the detected object contained by the sub-image.

\* \* \* \* \*